United States Patent
He et al.

(10) Patent No.: US 12,437,502 B2
(45) Date of Patent: Oct. 7, 2025

(54) METHOD FOR GENERATING OBJECTIVE FUNCTION, APPARATUS, ELECTRONIC DEVICE AND COMPUTER READABLE MEDIUM

(71) Applicant: Beijing Bytedance Network Technology Co., Ltd., Beijing (CN)

(72) Inventors: Yi He, Beijing (CN); Changhu Wang, Beijing (CN)

( * ) Notice: Subject to any disclaimer, the term of this patent is extended or adjusted under 35 U.S.C. 154(b) by 271 days.

(21) Appl. No.: 18/005,081

(22) PCT Filed: May 26, 2021

(86) PCT No.: PCT/CN2021/096144
§ 371 (c)(1),
(2) Date: Jan. 11, 2023

(87) PCT Pub. No.: WO2022/012178
PCT Pub. Date: Jan. 20, 2022

(65) Prior Publication Data
US 2023/0281956 A1  Sep. 7, 2023

(30) Foreign Application Priority Data
Jul. 16, 2020  (CN) .......................... 202010685574.2

(51) Int. Cl.
*G06V 10/72*    (2022.01)
*G06F 18/15*    (2023.01)
(Continued)

(52) U.S. Cl.
CPC .............. *G06V 10/72* (2022.01); *G06F 18/15* (2023.01); *G06F 18/21* (2023.01); *G06F 18/213* (2023.01);
(Continued)

(58) Field of Classification Search
CPC ...... G06V 10/72; G06V 10/32; G06V 10/761; G06V 10/7715; G06V 10/77; G06V 10/40;
(Continued)

(56) References Cited

U.S. PATENT DOCUMENTS

| 7,761,466 B1 | 7/2010 | Eshghi |
| 2008/0235515 A1* | 9/2008 | Yedidia ................ G06V 40/193 713/186 |

(Continued)

FOREIGN PATENT DOCUMENTS

| CN | 103744973 A | 4/2014 |
| CN | 104298791 A | 1/2015 |

(Continued)

OTHER PUBLICATIONS

Search machine translation of CN-110232152-A to Lin et al., Content Recommending Method, Device, Server, And Storage Medium, translated Dec. 9, 2024, 43 pages. (Year: 2024).*

(Continued)

*Primary Examiner* — Henok Shiferaw
*Assistant Examiner* — Dennis Rosario
(74) *Attorney, Agent, or Firm* — Alleman Hall & Tuttle LLP (57) ABSTRACT

A method for generating a target function is provided. The method includes: performing normalization processing on a vector corresponding to each pixel in a target feature map set to generate a target vector, so as to obtain a target vector set; generating hash coding corresponding to each vector in the target vector set, to obtain a hash coding set; determining a prior probability of each hash coding in the hash coding set; and generating a target function based on an entropy of the prior probability.

11 Claims, 5 Drawing Sheets

(51) Int. Cl.
*G06F 18/21* (2023.01)
*G06F 18/213* (2023.01)
*G06F 18/22* (2023.01)
*G06N 20/00* (2019.01)
*G06T 5/60* (2024.01)
*G06T 7/10* (2017.01)
*G06T 7/13* (2017.01)
*G06T 9/00* (2006.01)
*G06V 10/32* (2022.01)
*G06V 10/40* (2022.01)
*G06V 10/44* (2022.01)
*G06V 10/74* (2022.01)
*G06V 10/75* (2022.01)
*G06V 10/77* (2022.01)
*G06V 30/18* (2022.01)
*G06V 30/182* (2022.01)
*G06V 40/16* (2022.01)
*H04L 9/06* (2006.01)
*G06F 16/13* (2019.01)
*G06F 16/22* (2019.01)
*G06F 16/31* (2019.01)
*G06F 16/901* (2019.01)
*H04L 7/00* (2006.01)
*H04N 21/234* (2011.01)

(52) U.S. Cl.
CPC ............. *G06F 18/22* (2023.01); *G06N 20/00* (2019.01); *G06T 5/60* (2024.01); *G06T 7/10* (2017.01); *G06T 7/13* (2017.01); *G06T 9/00* (2013.01); *G06V 10/32* (2022.01); *G06V 10/40* (2022.01); *G06V 10/44* (2022.01); *G06V 10/74* (2022.01); *G06V 10/752* (2022.01); *G06V 10/757* (2022.01); *G06V 10/758* (2022.01); *G06V 10/761* (2022.01); *G06V 10/7715* (2022.01); *G06V 30/18* (2022.01); *G06V 30/1801* (2022.01); *G06V 30/182* (2022.01); *G06V 40/161* (2022.01); *G06V 40/168* (2022.01); *G06V 40/171* (2022.01); *H04L 9/0643* (2013.01); *G06F 16/137* (2019.01); *G06F 16/2255* (2019.01); *G06F 16/325* (2019.01); *G06F 16/9014* (2019.01); *G06F 2101/14* (2013.01); *G06F 2218/08* (2023.01); *G06F 2218/12* (2023.01); *G06T 2207/20081* (2013.01); *H04L 7/0087* (2013.01); *H04N 21/23418* (2013.01)

(58) Field of Classification Search
CPC .... G06V 10/44; G06V 10/806; G06V 40/168; G06V 10/75; G06V 40/171; G06V 10/74; G06V 10/757; G06V 10/42; G06V 10/765; G06V 10/766; G06V 10/80; G06V 30/18; G06V 40/1347; G06V 40/1359; G06V 30/1801; G06V 30/18143; G06V 60/18152; G06V 30/182; G06V 40/1353; G06V 40/1365; G06V 40/1371; G06V 40/1376; G06V 40/169; G06V 10/771; G06V 10/758; G06V 10/755; G06V 10/752; G06V 10/443; G06V 10/46; G06V 10/462; G06V 10/464; G06V 10/467; G06V 10/469; G06V 10/478; G06V 10/759; G06V 10/753; G06V 10/754; G06V 10/751; G06V 40/161; G06V 40/167; G06V 9/00; G06T 9/00; G06T 2207/20081; G06T 7/73; G06T 7/13; G06T 5/60; G06T 7/10; G06T 7/33; G06T 7/12; G06T 7/246; G06N 20/00; G06F 18/214; G06F 18/213; G06F 18/22; G06F 18/253; G06F 18/2413; G06F 30/27; G06F 18/2411; G06F 16/9014; G06F 18/24147; G06F 16/137; G06F 16/2255; G06F 16/325; G06F 18/15; G06F 2218/08; G06F 2218/12; G06F 2101/00; G06F 2101/14; G06F 18/211; G06F 18/21; G06F 18/2163; H04N 23/661; H04N 21/23418; H04N 7/147; H04N 1/00127; H04N 7/141; H04N 7/14; H04N 1/00204; H04N 1/00206; H04N 1/00209; H04N 1/00244; H04N 1/001; H04N 1/00177; H04N 1/00225; H04N 1/00222; H04N 1/00228; H04N 1/0023; H04N 1/00233; H04N 1/00238; H04N 1/00241; H04N 1/00236; H04N 21/238; H04N 21/239; H04N 21/60; H04N 21/61; H04N 21/6106; H04N 21/6156; H04N 21/6175; H04N 21/6187; H04N 21/6181; H04N 21/63; H04N 1/00281; H04N 1/00312; H04N 21/632; H04N 21/647; H04N 21/633; H04N 21/637; H04N 21/64723; H04N 21/64753; H04N 21/64761; H04N 21/64784; H04N 21/65; H04N 21/654; H04N 21/658; H04N 21/6473; H04N 21/64738; H04N 21/64707; H04N 21/64715; H04N 21/6371; H04N 21/6338; H04N 21/6131; H04N 21/6137; H04N 21/2381; H04N 21/23805; H04N 21/6582; H04N 21/436; H04N 21/437; H04N 21/438; H04N 21/44209; H04N 21/44245; H04N 21/4408; H04N 21/44227; H04L 9/50; H04L 9/3239; H04L 9/0643; H04L 9/3236; H04L 9/3242; H04L 45/08; H04L 43/12; H04L 65/65; H04L 67/1021; H04L 67/1023; H04L 47/00; H04L 61/00; H04L 51/00; H04L 63/00; H04L 65/00; H04L 65/1013; H04L 65/60; H04L 65/70; H04L 65/75; H04L 67/00; H04L 67/04; H04L 67/10; H04L 67/101; H04L 67/104; H04L 67/1097; H04L 67/12; H04L 67/131; H04L 67/1087; H04L 67/50; H04L 69/00; H04L 2463/00; H04L 9/00; H04L 9/40; H04L 12/00; H04L 12/1442; H04L 12/145; H04L 12/1836; H04L 41/00; H04L 43/00; H04L 45/00; H04L 45/10; H04L 51/06; H04L 51/52; H04L 61/30; H04L 61/35; H04L 61/45; H04L 63/06; H04L 63/04; H04L 63/10; H04L 63/18; H04L 63/20; H04L 65/103; H04L 65/1059; H04L 65/1063; H04L 67/55; H04L 67/75; H04L 2463/142; H04L 2463/141; H04L 69/169; H04L 69/168; H04L 69/085; H04L 67/5681; H04L 67/563; H04L 67/59; H04L 67/1076; H04L 65/1095; H04L 65/104; H04L 63/164; H04L 63/205; H04L 63/1408; H04L 63/0485; H04L 63/0457; H04L 63/045; H04L 63/0442; H04L 63/0435; H04L 61/4557; H04L 43/091; H04L 43/876; H04L 43/065; H04L 43/062; H04L 41/50; H04L 41/508; H04L 41/5096; H04L 41/5061; H04L 41/34;

H04L 41/28; H04L 41/20; H04L 41/18;
H04L 41/147; H04L 41/14; H04L 41/145;
H04L 41/24; H04L 41/26; H04L 41/32;
H04L 41/30; H04L 41/40; H04L 41/122;
H04L 41/12; H04L 41/0895; H04L
41/0894; H04L 41/0893; H04L 41/085;
H04L 41/0873; H04L 41/0869; H04L
41/08; H04L 41/082; H04L 41/0816;
H04L 41/0826; H04L 41/083; H04L
41/0833; H04L 41/0654; H04L 41/046;
H04L 41/048; H04L 41/052; H04L
41/0613; H04L 41/0645; H04L 41/04;
H04L 41/0233; H04L 41/024; H04L
41/0246; H04L 41/0213; H04L 12/66;
H04L 12/28; H04L 12/2801; H04L
12/2803; H04L 21/2805; H04L 12/2807;
H04L 12/2809; H04L 12/281; H04L
12/2812; H04L 12/2814; H04L 12/2816;
H04L 12/2818; H04L 12/2825; H04L
12/2827; H04L 12/283; H04L 12/2832;
H04L 12/2834; H04L 12/2836; H04L
12/2838; H04L 12/2854; H04L 12/2858;
H04L 12/2861; H04L 12/2859; H04L
12/2863; H04L 12/2869; H04L 12/287;
H04L 12/2879; H04L 12/40; H04L 12/42;
H04L 12/422; H04L 12/44; H04L 12/46;
H04L 12/4604; H04L 12/4608; H04L
12/4612; H04L 12/4616; H04L 12/462;
H04L 12/4633; H04L 12/4641; H04L
12/465; H04L 21/4654; H04L 12/4658;
H04L 12/4662; H04L 12/4675; H04L
12/4687; H04L 12/4691; H04L 12/4695;
H04L 2012/6443; H04L 12/1827; H04L
12/40097; H04L 12/5691; H04L 12/5692;
H04L 12/5602; H04L 2012/5614; H04L
2012/5615; H04L 2012/5619; H04L
2012/5626; H04L 2012/5621; H04L
2012/6475; H04L 61/5038; H04L
63/0272; H04L 63/061; H04L 63/145;
H04L 67/2876; H04L 9/0631; H04L
2012/5686; H04L 41/0273; H04L 41/042;
H04L 41/0668; H04L 41/0663; H04L
7/0087; H04W 4/00; H04W 4/203; H04W
4/21; H04W 8/00; H04W 16/00; H04W
60/00; H04W 64/00; H04W 80/00; H04W
84/00; H04W 84/18; H04W 92/00; H04W
88/00; H04W 88/005; H04W 88/02;
H04W 88/06; H04W 88/14; H04W 88/18;
H04W 92/02; H04W 92/04; H04W
92/045; H04W 92/06; H04W 92/08;
H04W 92/10; H04W 92/14; H04W 92/24;
H04W 4/18; H04W 8/005; H04W 8/26;
H04W 8/30; H04W 16/02; H04W 16/18;
H04W 16/14; H04W 28/00; H04W 48/00;
H04W 48/17; H04W 48/18; H04W
36/0022; H04W 36/00222; H04W 36/009;
H04W 36/12; H04W 36/14; H04W
64/003; H04W 88/182; H04W 88/185;
H04W 28/021; H04W 28/0247; H04W
28/0268; H04W 28/084; H04W 28/0846;
H04W 28/0883; H04W 28/12; H04W
36/1443; H04W 36/1446; H04W 40/023;
H04W 68/12; H04W 80/04; H04W
84/005; H04W 84/02; H04W 84/022;
H04W 84/04; H04W 84/105; H04W
84/10; H04W 84/06; H04W 84/12; H04W
84/22; H04W 8/245; H04W 16/20; H04W
36/00226; H04W 36/00224; H04W
36/033; H04W 36/035; H04W 36/165;
H04W 36/38; H04W 36/385; H04W
72/21; H04W 76/16; H04W 8/06; H04W
8/087; H04W 8/10; H04W 8/02; H04W
40/244; H04W 52/0203; H04W 16/225;
H04W 36/0066; H04W 52/0212; H04W
52/0222; H04W 52/28; H04W 52/386;
H04W 52/46

See application file for complete search history.

(56) References Cited

U.S. PATENT DOCUMENTS

| | | | |
|---|---|---|---|
| 2017/0076143 A1* | 3/2017 | Sapiro | G06F 18/2451 |
| 2019/0207753 A1 | 7/2019 | Lee et al. | |
| 2020/0026949 A1 | 1/2020 | Alcock et al. | |

FOREIGN PATENT DOCUMENTS

| | | | | |
|---|---|---|---|---|
| CN | 104765872 A | | 7/2015 | |
| CN | 109284411 A | | 1/2019 | |
| CN | 109325140 A | | 2/2019 | |
| CN | 109960738 A | | 7/2019 | |
| CN | 110209851 A | | 9/2019 | |
| CN | 110232152 A | * | 9/2019 | G06F 16/9535 |
| CN | 110363049 A | * | 10/2019 | G06T 9/00 |
| CN | 110543578 A | * | 12/2019 | G06F 16/535 |
| CN | 110929080 A | | 3/2020 | |
| CN | 111079826 A | * | 4/2020 | G06N 3/048 |
| CN | 111915689 A | | 11/2020 | |

OTHER PUBLICATIONS

Search machine translation of CN-110363049-A to Zhang et al., Of The Pattern Element Detection Identification And Type Determining Method And Device, translated Apr. 2, 2025, 40 pages. (Year: 2025).*

Search machine translation of CN-110543578-A to Huang et al., Object Recognition Method And Device, translated Apr. 2, 2025, 42 pages. (Year: 2025).*

Search updated machine translation of CN-10232152-A to Lin et al., Content Recommending Method, Device, Server, And Storage Medium, translation Apr. 2, 2025, 42 pages. (Year: 2025).*

Feng, 3D Object Understanding from RGB-D Data [thesis], 2017 [retrieved Jul. 31, 2025], Columbia University Libraries, 157 pages. DOI: https://doi.org/10.7916/D8FB5FHH (Year: 2017).*

Search machine translation of CN-110363049-A to Zhang, Of The Pattern Element Detection Identification And Type Determining Method And Device, translated Jul. 31, 2025, 40 pages. (Year: 2025).*

Search machine translation of CN-111079826-A to Wu, Fusion Construction Progress Of SLAM And Image Processing And Real-time Identification Method, translated Jul. 31, 2025, 8 pages, (Year: 2025).*

China National Intellectual Property Administration, Notice of Grant Issued in Application No. 202010685574.2, Oct. 31, 2023, 4 pages.

ISA China Intellectual Property Administration, International Search Report and Written Opinion for International Application No. PCT/CN2021/096144, mailed Aug. 24, 2021, 15 Pages.

Zheng X. et al., "Deep Balanced Discrete Hashing For Image Retrieval," Neurocomputing, vol. 403, Aug. 25, 2020, 15 pages.

* cited by examiner

METHOD FOR GENERATING OBJECTIVE FUNCTION, APPARATUS, ELECTRONIC DEVICE AND COMPUTER READABLE MEDIUM

CROSS REFERENCE OF RELATED APPLICATION

The present application is a National phase application of PCT international patent application PCT/CN2021/096144, filed on May 26, 2021, which claims the priority to Chinese Patent Application No. 202010685574.2, titled "METHOD FOR GENERATING OBJECTIVE FUNCTION, APPARATUS, ELECTRONIC DEVICE AND COMPUTER READABLE MEDIUM", filed on Jul. 16, 2020 with the State Intellectual Property Office of the PRC, both of which are incorporated herein by reference their entireties.

FIELD

The present disclosure relates to the technical field of computers, and in particular to a method and apparatus for generating a target function, an electronic device and a computer readable medium.

BACKGROUND

With development of internet and popularization of artificial intelligent technology based on deep learning, the computer vision technology is applied to various fields of life of people. Image features extracted by the existing image feature extraction network has the following problems: nonuniform image distribution and poor discrimination.

SUMMARY

This section is provided to introduce the concept briefly, and the concept is described in detail in specific embodiments hereinafter. This section is neither intended to identity key features or necessary features of the claimed technical solutions, nor intended to limit scope of the claimed technical solutions. According to embodiments of the present disclosure, a method, apparatus and device for generating a target function, and a computer readable medium are provided, to solve the technical problem mentioned in the background.

In a first aspect, a method for generating a target function is provided. The method includes: performing normalization processing on a vector corresponding to each pixel in a target feature map set to generate a target vector, so as to obtain a target vector set; generating hash coding corresponding to each vector in the target vector set, to obtain a hash coding set; determining a prior probability of each hash coding in the hash coding set; and generating a target function based on an entropy of the prior probability.

In a second aspect, an apparatus for generating a target function is provided according to embodiments of the present application. The apparatus includes: a normalization unit, a first generation unit, a first determination unit and a second generation unit. The normalization unit is configured to perform normalization processing on a vector corresponding to each pixel in a target feature map set to generate a target vector, to obtain a target vector set. The first generation unit is configured to generate hash coding corresponding to each vector in the target vector set, to obtain a hash coding set. The first generation unit is configured to generate hash coding corresponding to each vector in the target vector set, to obtain a hash coding set. The first determination unit is configured to determine a prior probability of each hash coding in the hash coding set. The second generation unit is configured to generate a target function based on an entropy of the prior probability.

In a third aspect, an electronic device is provided according to some embodiments of the present application. The electronic device includes: one or more processors; and a memory configured to store one or more programs. The one or more programs, when executed by one or more processors, cause the one or more processors to implement the method according to any implementation of the first aspect.

In a fourth aspect, a computer readable medium storing computer programs is provided according to embodiments of the present application. The computer programs are executed by a processor to implement the method according to any implementation of the first aspect.

The embodiments of the present application can generate the following beneficial effects. Normalization processing is performed on a vector corresponding to each pixel in a target feature map set to generate a target vector, to obtain a target vector set. Hash coding corresponding to each vector in the target vector set is generated, to obtain a hash coding set. The image feature is represented by the hash coding, thereby providing a basis for determining a target function. A prior probability of each hash coding in the hash coding set is determined, and the target function is generated based on an entropy of the prior probability. According to the above technical solution, the prior probability of each hash coding is obtained based on hash coding, the prior probability can represent distribution of image features, and the target function is determined based on the prior probability, so that the images are distributed more uniformly according to the target function, thereby realizing better discrimination.

BRIEF DESCRIPTION OF THE DRAWINGS

With reference to the drawings and specific embodiments below, the above and other features, advantages and aspects of the present disclosure become more apparent. Throughout the drawings, the same or similar reference numerals indicate the same or similar elements. It should be understood that the drawings are schematic, and components and elements are unnecessarily drawn in scale.

DETAILED DESCRIPTION OF EMBODIMENTS

Embodiments of the present disclosure are described in detail hereinafter with reference to the drawings. Although the drawings show some embodiments of the present disclosure, it should be understood that the present disclosure may be implemented by various embodiments and are not limited to be implemented by the embodiments clarified herein. The embodiments described in the present disclosure are intended to illustrate the present disclosure thoroughly and completely. It should be understood that the drawings and the embodiments are only schematic, and are not intended to limit the protection scope of the present disclosure.

It should be noted that, only parts related to the present disclosure are shown in the drawings for convenience of description. The embodiments and features in the embodiments described in the present disclosure may be combined with each other without a conflict.

It should be noted that, the terms "first'" "second" and so on mentioned in the present disclosure are only used to distinguish different apparatuses, modules or units, rather than limit an order of functions performed by the apparatus, module or unit or limit interdependence.

It should be noted that, the terms "one" and "multiple" mentioned in the present disclosure are schematic rather than restrictive, and should be understood as "one or more" by those skilled in the art, otherwise explicitly illustrated in the context.

Names of messages or information interacted between multiple apparatuses in the embodiments of the present disclosure are illustrative rather than limit the scope of the message or information.

The present disclosure is described in detail with reference to the drawings and in conjunction with embodiments hereinafter.

Figure 1:
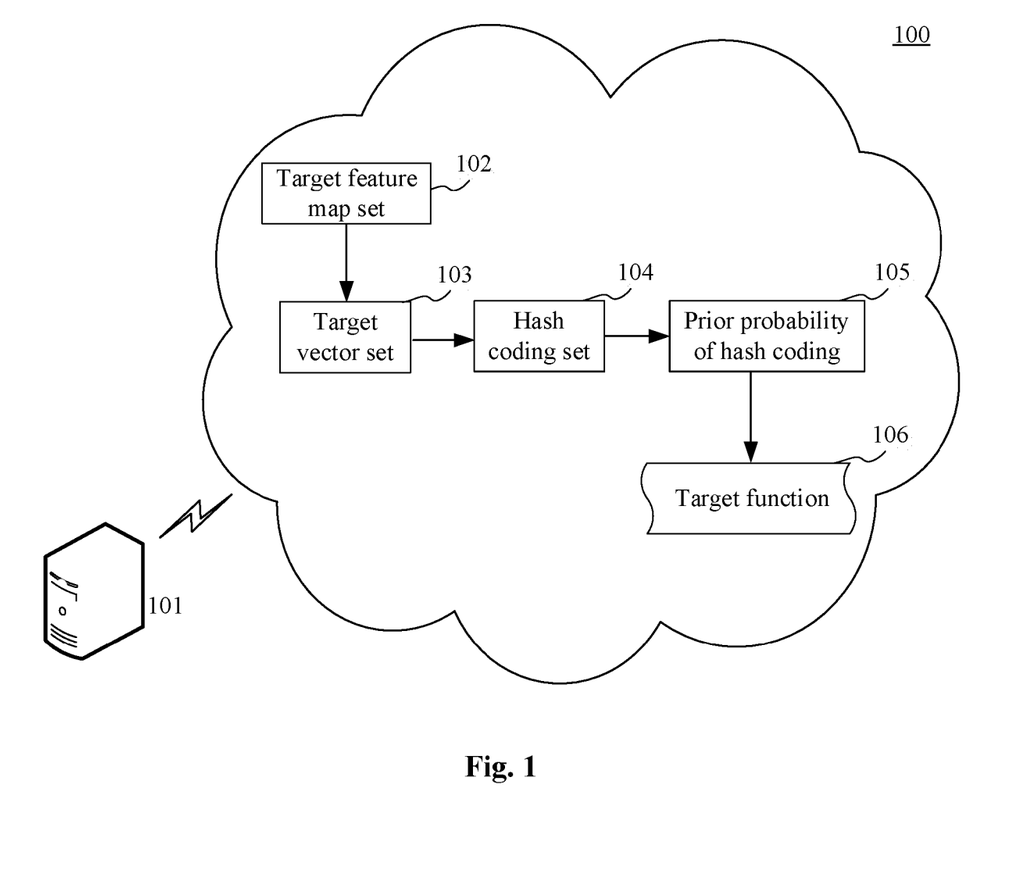
FIG. 1 is a schematic diagram of an application scenario of a method for generating a target function according to some embodiments of the present disclosure.

FIG. 1 is a schematic diagram 100 of an application scenario of a method for generating a target function according to some embodiments of the present disclosure.

As shown in FIG. 1, a computing device 101 performs normalization processing on a vector corresponding to each pixel in a target feature map set 102 to generate a target vector set 103. For example, a target feature map in the target feature map set 102 may be obtained by extracting features of any target image over a feature extraction network. The target image may be an image including a dog. Accordingly, the feature map is a contour map including main features of the dog such as eyes, nose, ears, mouth and tail. A vector corresponding to each pixel in this feature map is subjected to normalization processing to generate the target vector. Target vectors corresponding to all feature maps in the target feature map set 102 form the target vector set 103. For example, the target vector set 103 may include: a first target vector [0.1, 0.7, 0.8], a second target vector [0.2, 0.5, 0.6], . . . , an n-th target vector [0.7, 0.3, 0.9].

Hash coding corresponding to each target vector in the target vector set 103 is determined, to obtain a hash coding set 104. For example, the first target vector, the second target vector and the n-th target vector in the target vector set 103 respectively correspond to hash coding [0, 1, 1], [0, 1, 1] and [1, 0, 1].

A prior probability 105 of each hash coding in the hash coding set 104 is determined. For example, a coded value and a target vector value of each dimension of a specific hash coding in the hash coding set 104 are determined. If a coded value of a certain dimension is 0, the coded value may be converted into a difference between 1 and 0, that is, 1. If a target vector value of a certain dimension is 0.5, the target vector value may be converted into a difference between 1 and the target vector value. A sum of products of the coded value and the target vector value of each dimension is calculated, to obtain the prior probability of the specific hash coding. For example, a coded value $C_1$, $C_2$, $C_3$ of a fifth hash coding in the hash coding set 104 is 1, 0, 1, a target vector $P_{15}$, $P_{25}$, $P_{35}$ corresponding to the hash coding is 0.7, 0.3, 0.9, and the number of hash coding in the hash coding set is 100, thus the prior probability of the fifth hash coding is 0.023.

The target function 106 is generated based on the prior probability of each hash coding. In an example, a sum of products of the prior probability of each hash coding in the hash coding set and a logarithm value of the prior probability is calculated, and an inverse number of the sum is the target function 106. For example, the hash coding set includes three hash coding, a prior probability of a first hash coding is 0.2, a prior probability of a second hash coding is 0.7, and a prior probability of a third hash coding is 0.1, thus an entropy of the hash coding set is −0.36.

It should be understood that, the method for generating the target function may be performed by various software, the computing device 101, a server or a device integrated with the computing device 101 and the server over a network. The computing device 101 may be an electronic device having information processing capability, including but not limited to a smart phone, a tablet computer, an e-book reader, a laptop portable computer and a desktop computer. The method for generating the target function may be performed by software installed in the electronic device listed above. The software may be implemented as multiple software or software modules for providing distributed service, or may be implemented as single software or software module. Implementations of the software are not limited herein.

It should be understood that, the number of terminal devices in FIG. 1 is only schematic. Any number of terminal device may be provided according to actual need.

Figure 2:
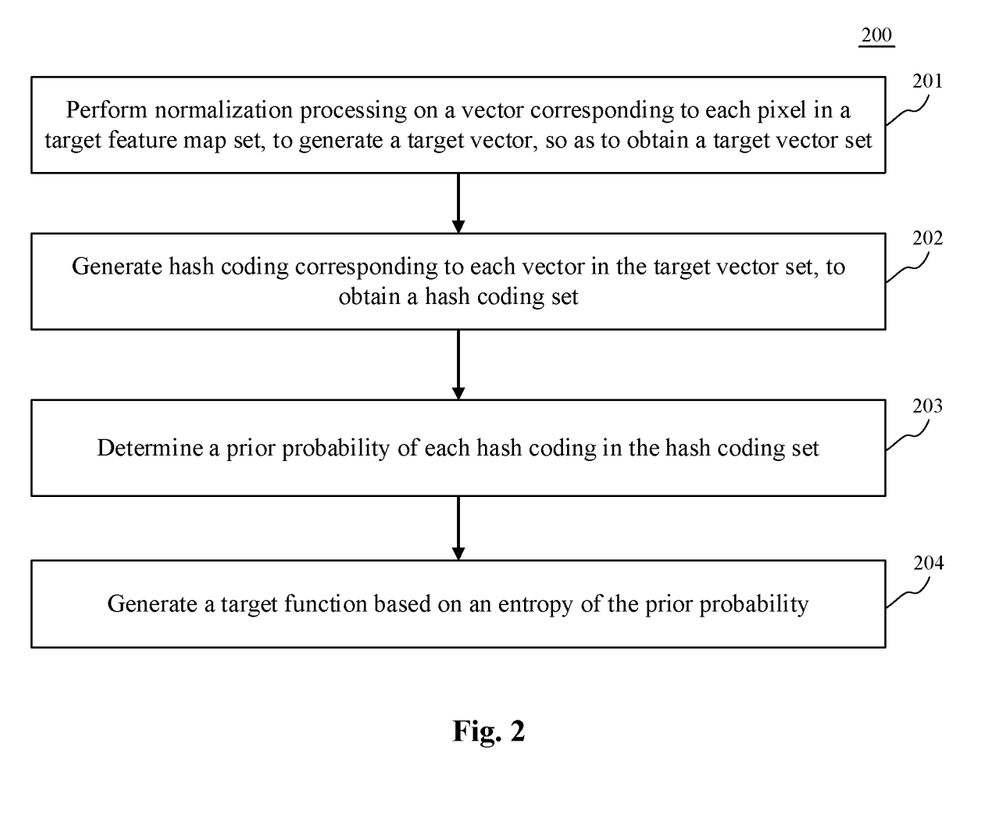
FIG. 2 is a flowchart of a method for generating a target function according to some embodiments of the present disclosure.

Reference is made to FIG. 2 which shows a flowchart 200 of a method for generating a target function according to some embodiments of the present disclosure. The method includes steps 201 to 204 as follows.

In step 201, normalization processing is performed on a vector corresponding to each pixel in a target feature map set, to obtain a target vector set.

In some embodiments, a device performing the method for generating the target function (for example the computing device 101 shown in FIG. 1) may perform normalization processing on a vector corresponding to each pixel in the target feature map, to obtain the target vector set. A vector value of the target vector is a number ranging from 0 to 1. The normalization processing is performed to process the data, and map the data into a range between 0 and 1, thereby facilitating data processing. For example, one target feature map may be consisted of multiple pixels. Each of the multiple pixels may be represented as one three-dimensional vector. A normalization operation is performed on the three-dimensional vector of each pixel to obtain a three-dimensional target vector. A vector value of the three-dimensional target vector ranges from 0 to 1.

In an example, normalization is performed on multiple dimensional vectors of a specific pixel in the target feature map. A first difference is calculated by subtracting a minimum vector value of the multiple dimensional vector from a vector value of each dimensional in the multiple dimensional vector, and a second difference between a maximum vector value and the minimum vector value of the multiple dimensional vector is calculated, and then the first difference is divided by the second difference, to obtain the target vector.

In step 202, hash coding corresponding to each vector in the target vector set is generated, to obtain a hash coding set.

In some embodiments, based on the target vector set obtained in step 201, the device performing the method may determine hash coding corresponding to each target vector in the target vector set, to obtain the hash coding set. In an example, the above vector is represented as hash coding by the following equation, to obtain the hash coding set:

$$C_i = \begin{cases} 0, & P_i \le 0.5 \\ 1, & P_i \ge 0.5 \end{cases}.$$

In which, C represents a coded value of hash coding corresponding to each position, i represents an i-th dimension of hash coding corresponding to the target vector, $C_i$ represents a coded value of hash coding corresponding to the i-th dimensional of the above hash coding, and P represents a vector value of the target vector. In addition, $P_i$ represents a vector value corresponding to an i-th dimensional vector of the target vector, and a value of the i-th dimensional of the target vector represents a probability that the i value of the corresponding hash coding is equal to 1.

In an example, a certain pixel of an image is represented as a three-dimensional vector, and three vectors of the three-dimensional vector are [20, 30, 40]. The three-dimensional vector is subjected to normalization to obtain a target vector P, and vector values of the vector P are [0, 0.5, 1], that is, $P_1$ is 0, $P_2$ is 0.5, and $P_3$ is 1. The hash coding C [0, 1, 1] can be obtained according to the above equation. In the above hash coding C, coded values $C_1$, $C_2$, $C_3$ of the hash coding are respectively 0, 1 and 1.

In step 203, a prior probability of each hash coding in the hash coding set is determined.

In some embodiments, the device performing the method may determine the prior probability of each hash coding in the hash coding set in multiple manners.

In some optional implementations of the some embodiments, the process of determining the prior probability of each hash coding includes: adding a first preset multiplexing result and a second preset multiplexing result to obtain an adding result; and determining an average of a sum of the adding results as the prior probability of each hash coding.

In some optional implementations of some embodiments, the process of determining the first preset multiplexing result and the second preset multiplexing result includes: determining a coded value of each dimension in each hash coding and a vector value corresponding to the coded value; determining a first difference between one and the coded value of each dimension in each hash coding and a second difference between one and the vector value; multiplexing the coded value of each dimension in each hash coding by the corresponding vector value, to obtain the first preset multiplexing result; and multiplexing the first difference by the second difference to obtain the second preset multiplexing result.

In an example, the above vector is represented as the hash coding according to the following equation, to obtain the hash coding set:

$$P(c) = \frac{1}{m} \sum_{i,j} p_{ij} c_i + (1 - p_{ij})(1 - c_i).$$

In which, P(c) represents a prior probability of hash coding c, m represents the number of hash coding in the hash coding set, i represents an i-th dimension of hash coding corresponding to the target vector, j represents a j-th hash coding in the hash coding set, $P_{ij}$ represents a vector value corresponding to i-th dimension hash coding of the j-th hash coding, that is, a vector value corresponding to the i-th dimension vector of the target vector, and $C_i$ represents a coded value of hash coding corresponding to the i-th dimension of the hash coding.

In an example, the fifth hash coding in the hash coding set is [1, 0, 1], and coded values $C_1$, $C_2$, and $C_3$ of the hash coding are respectively 1, 0 and 1. The target vector corresponding to the hash coding is [0.7, 0.3, 0.9], that is, $P_{15}$, $P_{25}$ and $P_{35}$ are respectively 0.7, 0.3 and 0.9. The number of hash coding in the hash coding set is 100, and thus a prior probability of the fifth hash coding is determined as 0.023. In a similar manner, prior probabilities of all hash coding in the hash coding set are determined.

In step 204, the target function is generated based on an entropy of all the prior probabilities.

In some embodiments, the device performing the method may generate the target function based on the prior probability of each hash coding obtained in step 203. The entropy of the prior probability may represent distribution of each hash coding in the entire hash coding set. A greater entropy value indicates that hash coding in the entire hash coding set is distributed more uniformly. That is, different feature maps differ greatly from each other. The target function is generated based on the entropy of the prior probability.

In some optional implementations of some embodiments, the process of generating the target function may include: determining a logarithm value of the prior probability of each hash coding; multiplexing the prior probability of each hash coding by a logarithm value of the prior probability to obtain a multiplexing result; calculating a sum of the multiplexing result; and determining an inverse number of the sum as the target function.

In an example, the target function is expressed according to the following equation:

$$J = -\sum_{i=1}^{m} p_{i(c)} \log(p_{i(c)}).$$

In which, J represents the target function, i=1 represents that an index value i corresponding to the hash coding is 1, p represents a prior probability, c represent hash coding, and $P_{i(c)}$ represents a prior probability of the i-th hash coding.

In an example, a sum of products of the prior probability of each hash coding in the hash coding set and the logarithm value of the prior probability is calculated, and an inverse number of the sum is determined as the target function. For example, the hash coding set includes three hash coding, a prior probability of a first hash coding is 0.2, a prior probability of a second hash coding is 0.7, and a prior probability of a third hash coding is 0.1, and thus an entropy of the hash coding set is −0.36.

The embodiments of the present disclosure can generate the following beneficial effects. Normalization processing is performed on a vector corresponding to each pixel in the target feature map set to generate the target vector, so as to obtain the target vector set. Hash coding corresponding to each vector in the target vector set is generated, to obtain a hash coding set. Image features are represented by hash coding, thereby providing basis for determining the target function. The prior probability of each hash coding in the hash coding set is determined, and the target function is generated based on the entropy of the prior probability.

According to the above method, the prior probability of each hash coding is obtained based on hash coding, and the prior probability may represent distribution of image features; and the target function is determined based on all the prior probabilities, so that the images are distributed more uniformly, thereby realizing better discrimination.

Figure 3:
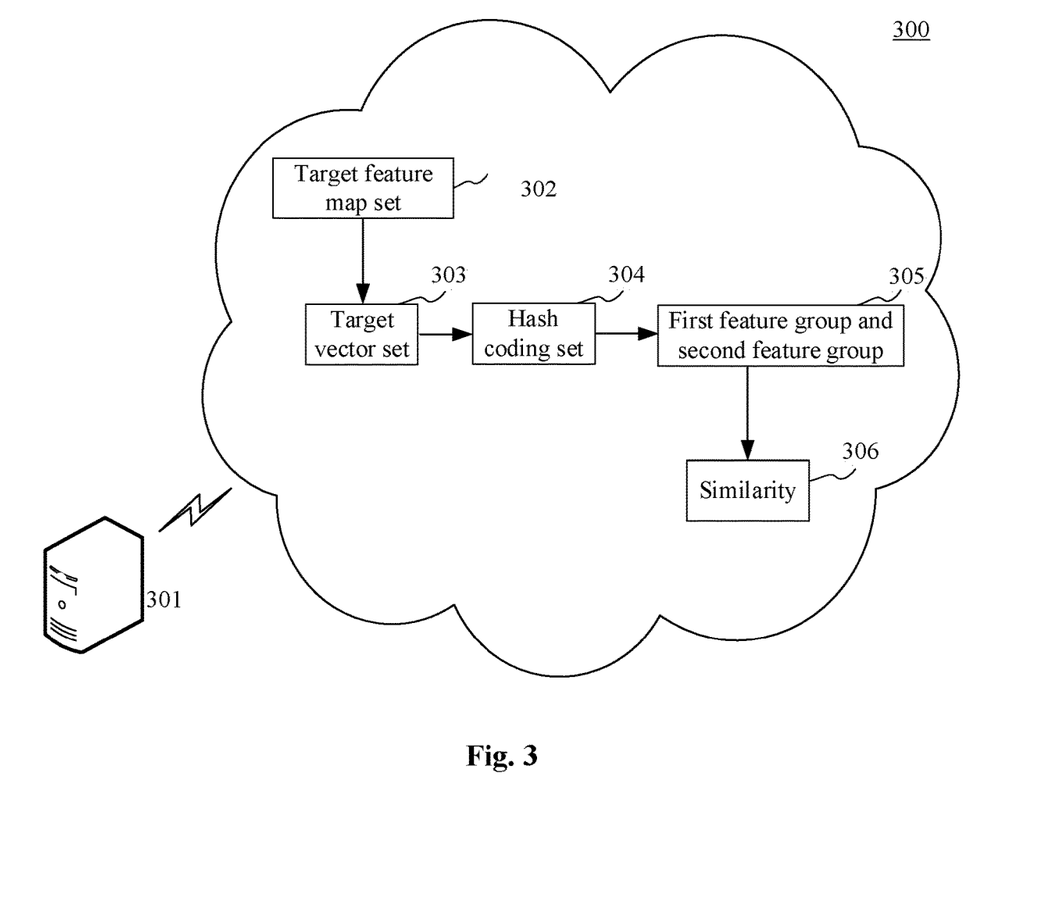
FIG. 3 is a schematic diagram of another application scenario of a method for generating a target function according to some embodiments of the present disclosure.

Reference is made to FIG. 3 which shows a schematic diagram 300 of another application scenario of a method for generating a target function according to some embodiments of the present disclosure.

As shown in FIG. 3, a computing device 301 performs normalization processing on a vector corresponding to each pixel in a target feature map set 302, to generate a target vector set 303. For example, a target feature map in the target feature map set 302 may be obtained by extracting features of any target image over a feature extraction network. For example, the target vector set 303 may include: a first target vector [0.1, 0.7, 0.8] indicating eyes of a dog, a second target vector [0.2, 0.5, 0.6] indicating a nose of the dog, a third target vector [0.1, 0.8, 0.8] indicating a mouth of the dog, and a fourth target vector [0, 0.9, 0.6] indicating a tail of the dog. In this way, a target vector set representing main information of a target feature map is obtained. The target feature map set includes multiple target feature maps, and thus the target vector set includes information of multiple target feature maps. Hash coding corresponding to each target vector in the target vector set 303 is determined, to obtain the hash coding set 304. For example, target vectors [0.1, 0.7, 0.8], [0.2, 0.5, 0.6], [0.1, 0.8, 0.8] and [0, 0.9, 0.6] corresponding to the eyes, nose, mouth and tail of the dog in the above example are converted into hash coding [0, 1, 1], [0, 1, 1], [0, 1, 1] and [0, 1, 1]. Hash coding meeting a predetermined condition in the hash coding set 304 is selected as a first feature group and a second feature group 305. For example, hash coding [0, 1, 1], [0, 1, 1] and [0, 1, 1] corresponding to main features of the dog such as the eyes, nose and mouth meeting the predetermined condition, and hash coding [1, 0, 1], [0, 1, 1] and [0, 1, 1] corresponding to main features of a cat such as eyes, a nose and a mouth meeting the predetermined condition, are selected as the first feature group and the second feature group. An intersection-to-union ratio between the first feature group and the second feature group is determined, and thus similarity 306 between a first image and a second image is determined. For example, similarity between the first feature group and the second feature group is 0.67.

Figure 4:
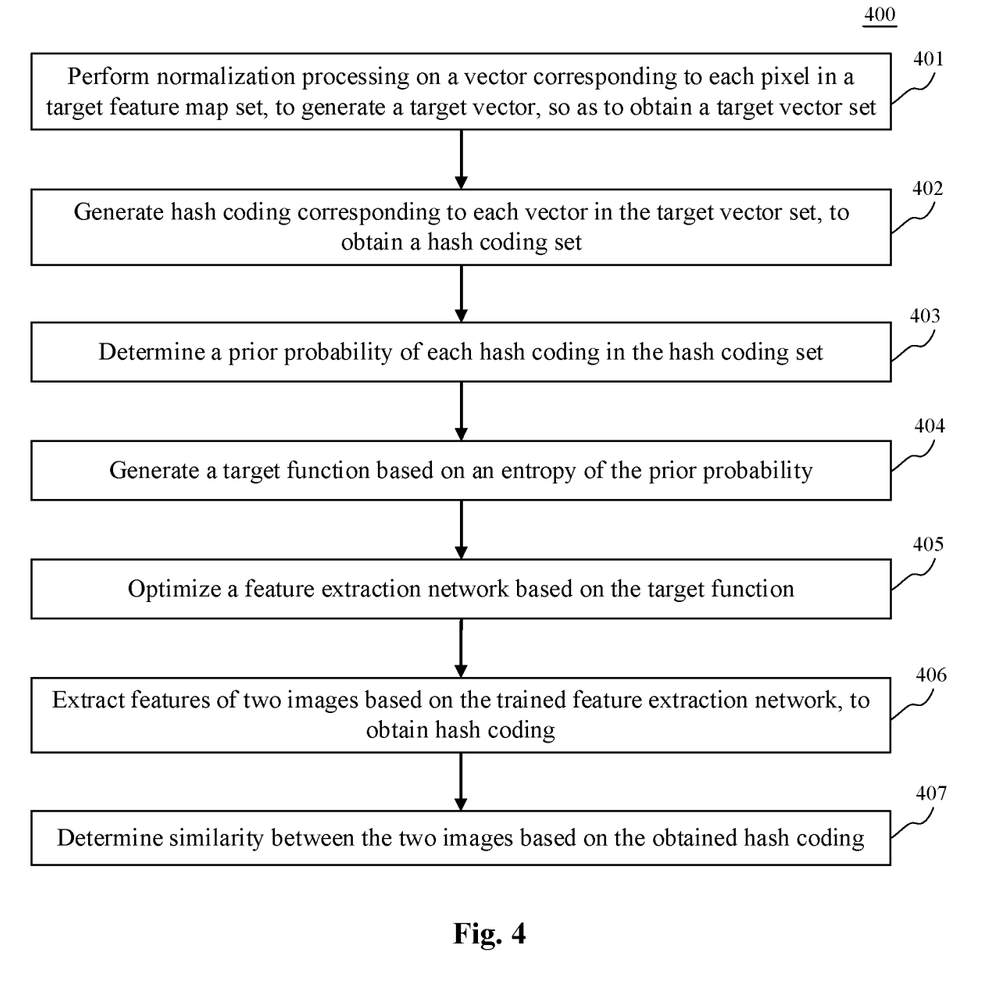
FIG. 4 is a flowchart of a method for generating a target function according to another embodiments of the present disclosure.

Reference is made to FIG. 4 which shows a flowchart 400 of a method for generating a target function according to another embodiment of the present disclosure. The method includes steps 401 to 407 as follows.

In step 401, normalization processing is performed on a vector corresponding to each pixel in a target feature map set, to generate a target vector, so as to obtain a target vector set.

In step 402, hash coding corresponding to each vector in the target vector set is generated, to obtain a hash coding set.

In step 403, a prior probability of each hash coding in the hash coding set is determined.

In step 404, a target function is generated based on an entropy of the prior probability.

In some embodiments, for implementations of steps 401 to 404 and resulting technical effects, one may refer to steps 201 to 204 in the above embodiments, and details are not described herein.

In step 405, the feature extraction network is optimized based on the target function, to obtain a trained feature extraction network.

In some embodiments, the target function is optimized by minimizing a negative likelihood logarithm, so that the feature extraction network can better learn parameters of the feature extraction network.

In step 406, features of two images are extracted through the trained feature extraction network, to obtain hash coding.

In some embodiments, features of two images are extracted through the trained feature extraction network, to obtain feature maps of two images. Normalization processing is performed on a vector corresponding to each pixel of the feature map to generate the target vector, so as to obtain the target vector set. Hash coding corresponding to each vector in the target vector set is generated.

In step 407, similarity between the two images is determined based on the obtained hash coding.

In some embodiments, intersection-to-union processing is performed on hash coding corresponding to two feature maps, thereby obtaining the similarity between the two images.

In some embodiments, the device performing the method performs optimization by minimizing a negative likelihood logarithm based on the target function generated in step 404, so that the feature extraction network can be better trained, and thus image features extracted are distributed more uniformly, thereby realizing better discrimination.

Compared with the description of the embodiments corresponding to FIG. 2, the method for generating a target function shown in FIG. 4 includes step of optimizing the target function. In this way, the feature extraction network has better network generalization capability, thereby effectively comparing the similarity between the two images.

Figure 5:
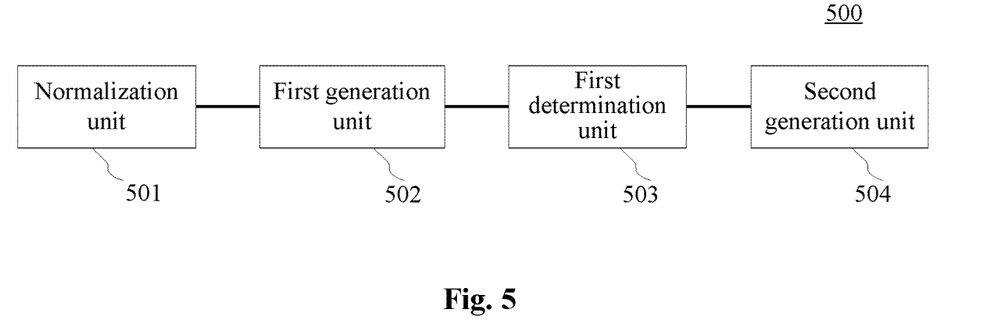
FIG. 5 is a schematic structural diagram of an apparatus for generating a target function according to some embodiments of the present disclosure.

FIG. 5 shows an apparatus for generating a target function according to some embodiments of the present disclosure, which may implement the methods shown in the above drawings. The apparatus embodiments correspond to the method embodiment shown in FIG. 2, and the apparatus may be applied to various electronic devices.

As shown in FIG. 5, the apparatus 500 for generating the target function includes: a normalization unit 501, a first generation unit 502, a first determination unit 503 and a second generation unit 504. The normalization unit 501 is configured to perform normalization processing on a vector corresponding to each pixel in a target feature map set, to generate a target vector, so as to obtain a target vector set. The first generation unit 502 is configured to generate hash coding corresponding to each vector in the target vector set, to obtain a target vector set. The first generation unit 502 is configured to generate hash coding corresponding to each vector in the target vector set, to obtain a hash coding set. The first determining unit 503 is configured to determine a prior probability of each hash coding in the hash coding set. The second generation unit 504 is configured to generate a target function based on an entropy of the prior probability.

In some optional implementations of the embodiments, the target feature map set is configured to extract features of the target image set through a feature extraction network, to obtain the target feature map set.

In some optional implementations of some embodiments, the apparatus 500 is further configured to add a first preset multiplexing result and a second preset multiplexing result to obtain an adding result; and determine an average of a sum of the adding result as the prior probability of each hash coding.

In some optional implementations of some embodiments, the apparatus 500 is further configured to: determine a coded value of each dimension in each hash coding and a vector value corresponding to the coded value; determine a first difference between one and the coded vale of each dimension in each hash coding and a second difference between one and the vector value; multiplex the coded value of each dimension in each hash coding by the corresponding vector value, to obtain the first preset multiplexing result; and multiplex the first difference by the second difference to obtain the second preset multiplexing result.

In optional implementations of some embodiments, the apparatus 500 is further configured to: determine a logarithm value of the prior probability of each hash coding; multiplexing the prior probability of each hash coding by the logarithm value of the prior probability of the hash coding, to obtain a multiplexing result; calculate a sum of the multiplexing result; and determine an inverse number of the sum of the multiplexing result as the target function.

In some optional implementations of some embodiments, the apparatus 500 further includes an optimizing unit configured to optimize the feature extraction network based on the target function, to obtain a trained feature extraction network.

In some optional implementations of some embodiments, the apparatus 500 further includes a second determining unit configured to: extract hash coding of two images through the trained feature extraction network; and determine similarity between the two images based on the extracted hash coding.

It should be understood that, the units included in the apparatus 500 correspond to steps in the method described with reference to FIG. 2. Therefore, operations, features and resulting beneficial effects described for the method also adapt to the apparatus 500 and units thereof, and details are not repeated herein.

Figure 6:
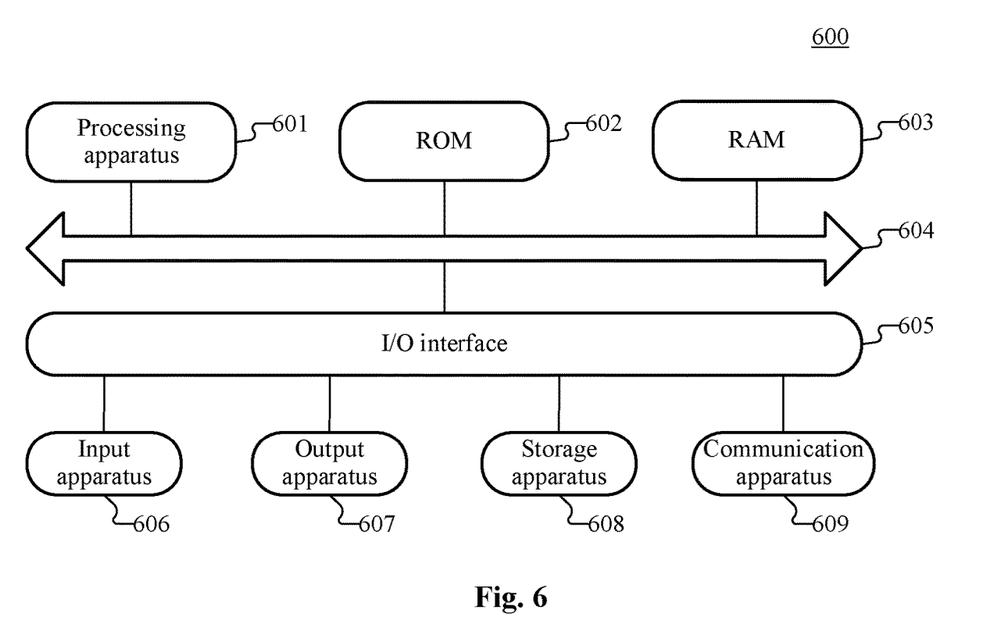
FIG. 6 is a schematic structural diagram of an electronic device for implementing the embodiments of the present disclosure.

Reference is made to FIG. 6 which shows a schematic structural diagram of an electronic device 600 (for example the computing device shown in FIG. 1) for implementing the embodiments of the present disclosure. The electronic device in the embodiments of the present disclosure may include but not limited to mobile terminals such as a mobile phone, a notebook computer, a digital broadcast receiver, a personal digital assistance (PDA), a tablet computer (PAD), a portable multi-media player (PMP) and a vehicle terminal (such as a vehicle navigation terminal); and fixed terminals such as digital TV and a desktop computer. The electronic device shown in FIG. 6 is schematic, and is not intended to limit functions and scope of the embodiments of the present disclosure.

As shown in FIG. 6, the electronic device 600 may include a processing apparatus (such as a central processor and a graphic processor) 601. The processing apparatus may perform various appropriate actions and processing by executing programs stored in a read-only memory (ROM) 602 or programs uploaded from a storage apparatus 608 to a random access memory (RAM) 603. Various programs and data required for operations of the electronic device 600 are also stored in the RAM 603. The processing apparatus 601, the ROM 602 and the RAM 603 are connected to each other through the bus 604. An input/output (I/O) interface 605 is also connected to the bus 604.

Generally, the following components are connected to the I/O interface 605: an input apparatus 606 such as a touch screen, a touch panel, a keyboard, a mouse, a camera, a microphone, an accelerometer, and gyroscope; an output apparatus 607 such as a liquid crystal display (LCD), a loudspeaker and a vibrator; a storage apparatus 608 such as a magnetic tape and a hard disk; and a communication apparatus 609. The communication apparatus 609 may allow the electronic device 600 to communicate with other device in a wired or wireless manner to exchange data. Although FIG. 6 shows the electronic device 600 provided with various apparatuses, it should be understood that not all shown apparatuses are necessary. Alternatively, more or less apparatuses may be included. Each block shown in FIG. 6 may represent one apparatus or multiple apparatuses according to need.

According to the embodiments of the present disclosure, a process described in the flowchart may be implemented by computer software programs. For example, according to an embodiment of the present disclosure, a computer program product including computer program carried on a computer readable medium is provided. The computer program includes program codes for performing the method shown in the flowchart. In such embodiment, the computer program may be downloaded and installed from the network through the communication apparatus 609, installed from the storage apparatus 608 or installed from the ROM 602. The computer program is executed by the processing apparatus 601 to perform functions defined in the methods described in the embodiments of the present disclosure.

It should be noted that, the computer readable medium described in embodiments of the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof. In some embodiments of the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code included in the computer readable medium may be transmitted via any appropriate medium, including but not limited to an electric wire, an optical fiber, radio frequency (RF) or any appropriate combination thereof.

In some embodiments, the client and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example the internet), a peer-to-peer network (for example ad hoc peer-to-peer network), and any known network or network to be developed.

The computer readable storage medium may be included in the electronic device, or the computer readable storage medium may be independent from the electronic device, i.e., not being installed in the electronic device. The computer readable medium carries one or more programs. When the one or more programs are executed by the electronic device, the electronic device is instructed to perform the following operations: performing normalization processing on a vector corresponding to each pixel in a target feature map set to generate a target vector, so as to obtain a target vector set; generating hash coding corresponding to each vector in the target vector set, to obtain a hash coding set; determining a prior probability of each hash coding in the hash coding set; and generating a target function based on entropy of the prior probability.

Computer program codes for performing operations embodiments of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams shown in the drawings show a system architecture, function and operation which may be implemented by the system, method and computer program product according to the embodiments of the present disclosure. Each block in the flowcharts or the block diagram may represent a part of a module, a program section or codes including one or more executable instructions for implementing specified logic functions. It should be noted that, in alternative embodiment, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware system for performing specified functions or operations, or may be implemented by a combination of dedicated hardware and computer instructions.

Units involved in the embodiments of the present disclosure may be implemented by software or hardware. The described units may be arranged in a processor, for example, a processor including a normalization unit, a first generation unit, a first determination unit and a second generation unit. Names of the units do not limit the units in a certain case. For example, the normalization unit may be described as a unit configured to perform normalization processing on a vector corresponding to each pixel in a target feature map set to generate a target vector, to obtain a target vector set.

The functions described above may be partially performed by one or more hardware logic components. For example, the typical hardware logic components includes but not limited to: a field programmable gate array (FPGA), an application specific integrated circuit (ASIC), an application specific standard product (ASSP), a system on chip (SOC), a complex programmable logic device (CPLD) and so on.

According to one or more embodiments of the present disclosure, a method for generating a target function is provided. The method includes: performing normalization processing on a vector corresponding to each pixel in a target feature map set to generate a target vector, so as to obtain a target vector set; generating hash coding corresponding to each vector in the target vector set, to obtain a hash coding set; determining a prior probability of each hash coding in the hash coding set; and generating a target function based on an entropy of the prior probability.

According to one or more embodiments of the present disclosure, a first preset multiplexing result is added with a second preset multiplexing result, to obtain an adding result. An average of a sum of the adding result is determined as a prior probability of each hash coding.

According to one or more embodiments of the present disclosure, a coded value of each dimension in each hash coding and a vector value corresponding to the coded value are determined; a first difference between one and the coded value of each dimension in each hash coding and a second difference between one and the vector value are determined; the coded value of each dimension in each hash coding is multiplexed by the corresponding vector value, to obtain the first preset multiplexing result; and the first difference is multiplexed by the second difference to obtain the second preset multiplexing result.

According to one or more embodiments of the present disclosure, a logarithm value of the prior probability of each hash coding is determined; the prior probability of each hash coding is multiplexed by the logarithm value of the prior probability of the hash coding, to obtain a multiplexing result; a sum of the multiplexing result is calculated; and an inverse number of the multiplexing result is determined as the target function.

According to one or more embodiments of the present disclosure, the target feature map set is obtained by: extracting features of the target image set over a feature extraction network.

According to one or more embodiments of the present disclosure, the feature extraction network is optimized based on the target function, to obtain a trained feature extraction network.

According to one or more embodiments of the present disclosure, hash coding of two images is extracted through the trained feature extraction network; and similarity between the two images is determined based on the extracted hash coding.

According to one or more embodiments of the present disclosure, an apparatus for generating a target function is provided. The apparatus includes a normalization unit, a first generation unit, a first determination unit and a second generation unit. The normalization unit is configured to: perform normalization processing on a vector corresponding to each pixel in a target feature map set to generate a target vector, so as to obtain a target vector set. The first generation unit is configured to generate hash coding corresponding to each vector in the target vector set, to obtain a hash coding set. The first determining unit is configured to determine a prior probability of each hash coding in the hash coding set.

The second generating unit is configured to generate a target function based on an entropy of the prior probability.

According to one or more embodiments of the present disclosure, the apparatus is further configured to: add a first preset multiplexing result and a second preset multiplexing result to obtain an adding result; and determine an average of a sum of the adding result as the prior probability of each hash coding.

According to one or more embodiments of the present disclosure, the apparatus is further configured to: determine a coded value of each dimension in each hash coding and a vector value corresponding to the coded value; determine a first difference between one and the coded value of each dimension in each hash coding and a second difference between one and the vector value; multiplex the coded value of each dimension in each hash coding by the corresponding vector value, to obtain the first preset multiplexing result; and multiplex the first difference by the second difference to obtain the second preset multiplexing result.

According to one or more embodiments of the present disclosure, the apparatus is further configured to: determine a logarithm value of the prior probability of each hash coding; multiplex the prior probability of each hash coding by the logarithm value of the prior probability of the hash coding, to obtain a multiplexing result; calculate a sum of the multiplexing result; and determine an inverse number of the sum of the multiplexing result as the target function.

According to one or more embodiments of the present disclosure, the target feature map set is further configured to extract features of the target image set over a feature extraction network, to obtain a target feature map set.

According to one or more embodiments of the present disclosure, the apparatus 500 further includes an optimization unit configured to optimize a feature extraction network based on the target function, to obtain a trained feature extraction network.

According to one or more embodiments of the present disclosure, the apparatus 500 further includes a second determination unit configured to: extract hash coding of two images based on the trained feature extraction network; and determine similarity between the two images based on the extracted hash coding.

Only preferred embodiments of the present disclosure and the technical principles applied are described above. It should be understood by those skilled in the art that, the protection scope of the embodiments of the present disclosure is not limited to the technical solutions formed a specific combination of the above technical features, and the protection scope of the present disclosure also covers other technical solutions formed by any combination of the above technical features and equivalent features thereof without departing from the concept of the present disclosure, for example, the technical solutions formed by mutual replacement between the above technical features and the technical features with similar functions disclosed in the embodiments of the present disclosure (not limited).

What is claimed is:

1. A method for generating a target function comprising:
performing normalization processing on a vector corresponding to each pixel in a target contour feature map set to generate a target vector, so as to obtain a target vector set, wherein the target contour feature map set is obtained by extracting features of a target image set over a feature extraction network;
generating hash coding corresponding to each vector in the target vector set, to obtain a uniform hash coding set;
determining a prior probability of each hash coding in the uniform hash coding set;
generating a target function based on an entropy of the prior probability, the prior probability represents distribution of image features; and
optimizing the feature extraction network based on the target function to obtain a trained feature extraction network.

2. The method according to claim 1, wherein the determining a prior probability of each hash coding in the uniform hash coding set comprises:
adding a first preset multiplexing result and a second preset multiplexing result to obtain an adding result; and
determining an average of a sum of the adding result as the prior probability of each hash coding.

3. The method according to claim 2, wherein the first preset multiplexing result and the second multiplexing result are obtained by:
determining a coded value of each dimension in each hash coding and a vector value corresponding to the coded value;
determining a first difference between one and the coded value of each dimension in each hash coding and a second difference between one and the vector value;
multiplexing the coded value of each dimension in each hash coding by the corresponding vector value, to obtain the first preset multiplexing result; and
multiplexing the first difference by the second difference to obtain the second preset multiplexing result.

4. The method according to claim 3, further comprising:
extracting features of two images based on the trained feature extraction network, to obtain hash coding; and
determining similarity between the two images based on the obtained hash coding.

5. The method according to claim 1, wherein the target function is obtained by:
determining a logarithm value of the prior probability of each hash coding;
multiplexing the prior probability of each hash coding by the logarithm value of the prior probability of the hash coding, to obtain a multiplexing result;
calculating a sum of the multiplexing result; and
determining an inverse number of the sum of the multiplexing result as the target function.

6. An apparatus for training a feature extraction network comprising:
at least one processor; and
at least one memory communicatively coupled to the at least one processor and storing instructions that upon execution by the at least one processor cause the apparatus to:
perform normalization processing on a vector corresponding to each pixel in a target contour feature map set to generate a target vector, to obtain a target vector set, wherein the target contour feature map set is obtained by extracting features of a target image set over the feature extraction network;
generate hash coding corresponding to each vector in the target vector set, to obtain a uniform hash coding set;
determine a prior probability of each hash coding in the uniform hash coding set;
generate a target function based on an entropy of the prior probability, the prior probability represents distribution of image features; and optimize the feature extraction network based on the target function to obtain a trained feature extraction network.

7. The apparatus of claim 6, the at least one memory further storing instructions that upon execution by the at least one processor cause the apparatus to:
add a first preset multiplexing result and a second preset multiplexing result to obtain an adding result; and
determine an average of a sum of the adding result as the prior probability of each hash coding.

8. The apparatus of claim 7, the at least one memory further storing instructions that upon execution by the at least one processor cause the apparatus to:
determine a coded value of each dimension in each hash coding and a vector value corresponding to the coded value;
determine a first difference between one and the coded value of each dimension in each hash coding and a second difference between one and the vector value;
multiplex the coded value of each dimension in each hash coding by the corresponding vector value, to obtain the first preset multiplexing result; and
multiplex the first difference by the second difference to obtain the second preset multiplexing result.

9. The apparatus of claim 8, the at least one memory further storing instructions that upon execution by the at least one processor cause the apparatus to:
extract features of two images based on the trained feature extraction network, to obtain hash coding; and
determine similarity between the two images based on the obtained hash coding.

10. The apparatus of claim 6, the at least one memory further storing instructions that upon execution by the at least one processor cause the apparatus to:
determine a logarithm value of the prior probability of each hash coding;
multiplex the prior probability of each hash coding by the logarithm value of the prior probability of the hash coding, to obtain a multiplexing result;
calculate a sum of the multiplexing result; and
determine an inverse number of the sum of the multiplexing result as the target function.

11. A computer readable non-transitory storage medium, bearing computer-readable instructions that upon execution on a computing device cause the computing device at least to:
perform normalization processing on a vector corresponding to each pixel in a target contour feature map set to generate a target vector, to obtain a target vector set, wherein the target contour feature map set is obtained by extracting features of a target image set over a feature extraction network;
generate hash coding corresponding to each vector in the target vector set, to obtain a uniform hash coding set;
determine a prior probability of each hash coding in the uniform hash coding set;
generate a target function based on an entropy of the prior probability, the prior probability represents distribution of image features; and
optimize the feature extraction network based on the target function to obtain a trained feature extraction network.

* * * * *